C. T. AND A. G. EWING.
SIGNAL FOR INDICATING SUBNORMAL PRESSURE IN PNEUMATIC TIRES.
APPLICATION FILED AUG. 26, 1919.
1,350,016.
Patented Aug. 17, 1920.
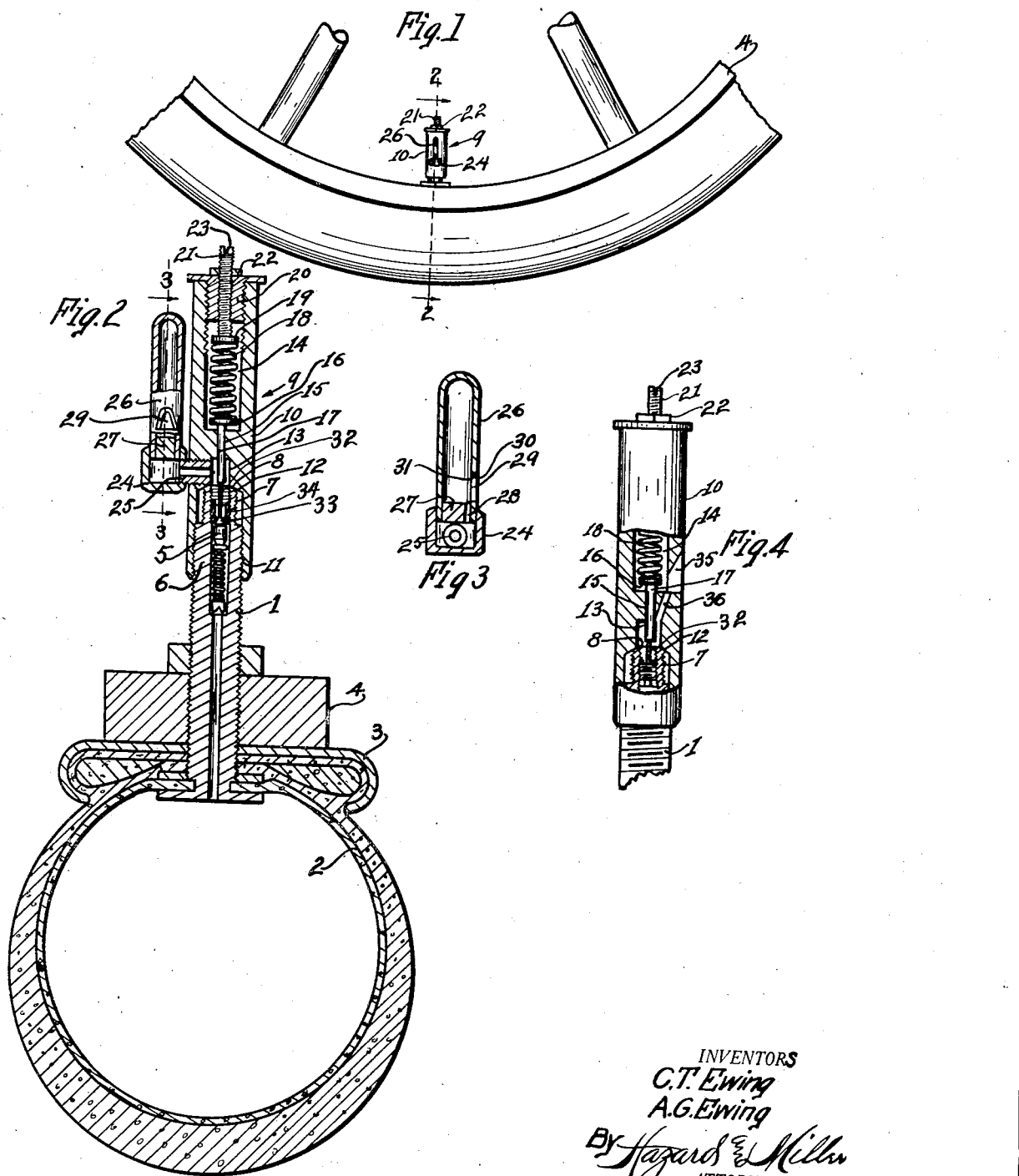
INVENTORS
C. T. Ewing
A. G. Ewing
By Hazard & Miller
ATTORNEYS

UNITED STATES PATENT OFFICE.

CLYDE THOMAS EWING AND ARTHUR G. EWING, OF LOS ANGELES, CALIFORNIA.

SIGNAL FOR INDICATING SUBNORMAL PRESSURE IN PNEUMATIC TIRES.

1,350,016.　　　　Specification of Letters Patent.　　Patented Aug. 17, 1920.

Application filed August 26, 1919. Serial No. 319,991.

*To all whom it may concern:*

Be it known that we, CLYDE THOMAS EWING and ARTHUR GARFIELD EWING, citizens of the United States, residing at Los Angeles, in the county of Los Angeles and State of California, have invented new and useful Improvements in Signals for Indicating Subnormal Pressure in Pneumatic Tires, of which the following is a specification.

Our object is to make a signal for indicating subnormal pressure in pneumatic tires, and our invention consists of the novel features herein shown, described and claimed.

Figure 1 is a fragmentary side elevation of a wheel provided with a pneumatic tire having a signal for indicating subnormal pressure in accordance with the principles of our invention.

Fig. 2 is an enlarged cross sectional detail on the line 2—2 of Fig. 1.

Fig. 3 is a sectional detail on the line 3—3 of Fig. 2.

Fig. 4 is a fragmentary view analogous to Fig. 2 and showing a modified construction.

The tire valve 1 is connected to the inner tube 2 and extends through the rim 3 and felly 4 in the ordinary way, and the tire valve 1 has a regular Schrader valve inside 5 mounted in the externally screw-threaded valve casing 6. The valve casing 6 has a reduced and externally screw-threaded nipple 7 for receiving a cap and the upper end 8 of the nipple 7 is finished. The low pressure signal 9 is adapted to be screwed upon the valve casing 6 and must be removed to inflate the tire.

The details of the low pressure signal 9 are as follows:

The cylindrical signal casing 10 is straight, formed with a thick transverse wall 40 and has an internal screw-thread 11 at its lower end to fit the screw-thread of the casing 6 and a seat 12 on one side of said wall 40 to fit the end 8 of the nipple 7. A bore 13 extends upwardly from the seat 12 through the wall 40 in line with the bore through the nipple 7. A bore 14 extends downwardly from the upper end of the casing 10 and a reduced bearing bore 15 extends through the wall 40, and connects the bores 13 and 14. The spring seat 16 fits loosely in the bore 14 and has a stem 17 fitting in the bearing bore 15. An expansive coil spring 18 fits loosely in the bore 14 against the valve seat 16. A spring seat 19 fits against the spring 18. A bushing 20 is screwed into the upper end of the casing 10. An adjusting screw 21 is tapped through the bushing 20 against the valve seat 19 and a lock nut 22 is mounted upon the outer end of the screw 21 against the bushing 20, so that the nut 22 may be loosened and the screw 21 manipulated to regulate the tension of the spring 18. Preferably the outer end of the screw 21 has a kerf 23. An elbow 24 has a nipple 25 screwed into its side opening and screwed into the casing 10 and wall 40 to communicate with the bore 13.

The whistle casing 26 is closed at its upper end, a plug 27 is fixed in the lower end and has an opening 28 at one side and the lower end of the casing 26 is fixed in the upper outlet of the elbow 24. A whistle opening 29 is formed through the casing 26, the upper side of the opening having a bevel 30 and the lower edge 31 of the bevel 30 being substantially in line with the opening 28.

The stem 32 of the valve inside 5 extends from the valve 33 through the nut 34 carrying the valve seat and is in position to be engaged by the stem 17. The normal air pressure in the inner tube 2 holds the valve 33 seated and the screw 21 is adjusted so that the tension of the spring 18 will not unseat the valve 33 until the pressure in the tire goes below normal.

If it is desired to carry a sixty pound pressure in the tire and the pressure goes down say to fifty pounds, or less the spring 18 will unseat the valve 33, the tire will go flat, and the air rushing through the tire valve 1 will pass through the nipple 25, through the opening 28 and whistle thus giving a signal to the operator that the tire is flat.

In the modification shown in Fig. 4 the whistle opening 35 is formed in the side of the casing 10 and communicates with the bore 14 and the port 36 is formed on an incline from the bore 14 and whistle opening 25 through the wall 40 to the bore 13, so that the air will pass through the port 36 to the whistle opening 35, and the parts 24, 25, 26, 27, 28, 29 and 30 are omitted, otherwise the construction is the same as in Fig. 2.

Various changes may be made without departing from the spirit of our invention as claimed.

We claim:

1. A low pressure signal for pneumatic tires comprising a casing adapted to be screwed upon the tire valve stem and having a whistling aperture formed in its wall, a wall extending transversely of said casing above said aperture, a rod slidably mounted in said transverse wall and adapted to extend to and engage the valve in the valve stem, a spring mounted to press against the upper end of said rod above said transverse wall, and means for adjusting the pressure exerted by the spring whereby a decrease of a pre-determined pressure in the tire will cause the tire valve to be opened and the whistle to be blown.

2. A low pressure signal for pneumatic tires including a casing provided with an internal thread in one end adapted to screw on the end of a tire valve, a thick wall extending transversely of the casing, and formed with a seat at one side to engage the end of said tire valve, said transverse wall being provided with a bore, leading from said seat and communicating with the end of said tire valve, and with a smaller bore leading from said larger bore through the other side of said transverse wall, a rod extending through said bores and slidably mounted in said smaller bore, one end of said rod engaging the tire valve stem, a spring seat on the other end of said rod, a bushing screwed into the other end of said casing, a screw extending through said bushing, a spring seat on the inner end of said screw, a spring interposed between said spring seats, said casing being provided with a whistle opening, and said transverse wall being provided with a port leading from said larger bore through the other side of the wall and communicating with said whistle opening.

3. A low pressure signal for pneumatic tires including a casing provided with an internal thread in one end adapted to screw on the end of a tire valve, a thick wall extending transversely of the casing, and formed with a seat at one side to engage the end of said tire valve, said transverse wall being provided with a bore, leading from said seat and communicating with the end of said tire valve, and with a smaller bore leading from said larger bore through the other side of said transverse wall, a rod extending through said bores and slidably mounted in said smaller bore, one end of said rod engaging the tire valve stem, a spring seat on the other end of said rod, a bushing screwed into the other end of said casing, a screw extending through said bushing, a spring seat on the inner end of said screw, a spring interposed between said spring seats, and a whistle, said transverse wall being provided with a port leading from said larger bore to said whistle.

In testimony whereof we have signed our names to this specification.

CLYDE THOMAS EWING.
ARTHUR G. EWING.